United States Patent
Brooke

[15] 3,669,209
[45] June 13, 1972

[54] VEHICLE GUIDANCE SYSTEMS

[72] Inventor: David William Ingham Brooke, Brightwell, England

[73] Assignee: International Harvester Company of Great Britain Limited, London, England

[22] Filed: Oct. 13, 1969

[21] Appl. No.: 865,933

[30] Foreign Application Priority Data

Oct. 16, 1968  Great Britain......................49,142/68
Dec. 4, 1968   Great Britain......................57,499/68

[52] U.S. Cl...................................180/98, 180/79.1, 172/2, 318/587, 318/608
[51] Int. Cl.......................................................B60k 27/06
[58] Field of Search....................180/98, 79, 79.1; 318/580, 318/587, 608; 172/2, 3

[56] References Cited

UNITED STATES PATENTS

| | | |
|---|---|---|
| 3,029,890 | 4/1962 | Mountjoy............................180/79.1 |
| 3,468,391 | 9/1969 | Rushing et al. ..........................180/98 |
| 3,407,895 | 10/1968 | Hasenbalg............................180/98 X |
| 3,128,840 | 4/1964 | Barrett, Jr..........................318/587 X |
| 3,431,996 | 3/1969 | Giles et al. ..........................318/587 X |
| 2,835,858 | 5/1958 | Moseley............................180/79.1 X |

Primary Examiner—Benjamin Hersh
Assistant Examiner—John P. Silverstrim
Attorney—Floyd B. Harmon

[57] ABSTRACT

A vehicle is guided at a desired angle in relation to, preferably parallel to, the lines of constant magnetic field strength resulting from a guide wire carrying an electric current by using two magnetic detectors which are positioned on the vehicle in a line having a substantial component in the direction of advance of the vehicle.

This method of guiding a vehicle has particular application in turning a vehicle at the end of a traverse along a line of constant gradient of magnetic field strength under the control of the guide wire.

18 Claims, 15 Drawing Figures

INVENTOR
DAVID W.I. BROOKE

INVENTOR
DAVID W. I. BROOKE

TYPICAL WIRING PATTERN

SINGLE LOOP

SINGLE BLOCK BETWEEN LOOPS.

INVENTOR
DAVID W. I. BROOKE

VEHICLE GUIDANCE SYSTEMS

This invention relates to vehicle guidance systems, and particularly to a method of guiding a vehicle in a desired path and a vehicle having a magnetic sensing head arrangement for controlling the movement of the vehicle substantially along a desired path.

Vehicle guidance systems are known in which electromagnetic signals emitted from one or a number of guide wires are detected on the vehicle and used to give an indication of the relationship of the vehicle to a guide wire. The present invention is concerned with a new development in such vehicle guidance systems in which the vehicle is guided in a desired path in relation to lines of constant magnetic field strength which are set up by the system of guide members. The essential feature of a method in accordance with the present invention is that the magnetic field strength shall be detected at two points on the vehicle separated by a distance having a component in a fore and aft direction, that is to say in the direction of advance of the vehicle.

Broadly in accordance with the present invention there is provided in a vehicle guidance system employing a plurality of guide wires, each emitting an electromagnetic guide signal, a method of guiding a vehicle in a desired path relative to a line of constant magnetic field strength comprising the steps of so connecting two detectors, which are spaced apart on the vehicle by a distance having a component in the direction of advance of the vehicle, that the outputs of the detectors are in phase-opposition when the direction of the axial component of the magnetic field is the same in both detectors, and utilizing a resultant output dependent upon the algebraic sum of the signals generated in the two detectors to provide an indication of the relationship of the vehicle to the desired path or to control a servo steering system to guide the vehicle along the desired path.

The method in accordance with the present invention has one application in the guidance of a vehicle along a desired path oblique to the lines of constant magnetic field strength, and, when a vehicle is to be guided in such a way, two similar magnetic detectors, for example coils having their magnetic axes vertically disposed, are spaced apart on the vehicle in a line oblique to the direction of advance of the vehicle. The two coils are connected in phase-opposition when the direction of the axial component of the magnetic field is the same in both the coils, and any difference signal obtained from the coils is utilized to provide an indication of a departure from the desired path oblique to a line of constant magnetic field strength or to control a servo steering system to return the vehicle to the desired path.

Alternatively the vehicle may be controlled to follow a path oblique to the lines of constant magnetic field strength by using two dissimilar coils arranged in a line parallel to the direction of advance, or, as a further alternative, by using two similar coils arranged in a line parallel to the direction of advance, but with the output from one coil passed through an attenuator. Preferably the attenuator is variable so that the angle of obliquity may be varied.

The invention has more particular application, however, in guiding a vehicle in a desired path along or parallel to a line of constant magnetic field strength. In accordance with this aspect of the present invention therefore there is provided in a vehicle guidance system employing a plurality of guide wires each emitting an electromagnetic guide signal, a method of guiding a vehicle in a desired path along a line of constant magnetic field strength comprising the steps of connecting two coils, which have their magnetic axes vertically disposed, and which are spaced apart on the vehicle by a distance having a component in the direction of advance of the vehicle, in phase-opposition when the direction of the axial component of the magnetic field is the same in both coils, and utilizing a resultant output dependent upon the algebraic sum of the voltages induced in the two coils to provide an indication of the relationship of the vehicle to the desired path or to control a servo steering system to guide the vehicle along the desired path.

In accordance with a preferred feature of the present invention there is provided in a vehicle guidance system employing a plurality of guide wires each emitting an electromagnetic guide signal, a method of guiding a vehicle in a desired path along a line of constant magnetic field strength comprising the steps of connecting two coils, which have their magnetic axes vertically disposed, and which are spaced apart on the vehicle in the direction of advance of the vehicle, in phase-opposition when the direction of the axial component of the magnetic field is the same in both the coils to produce a resultant output dependent upon the algebraic sum of the voltages induced in the two coils, and utilizing any difference signal obtained from the coils to provide an indication of a departure from the desired path or to control a servo steering system to return the vehicle to the desired path.

When guiding a vehicle in a path along or parallel to a line of constant magnetic field strength, preferably two similar coils are arranged on the vehicle in a line parallel to the direction of advance of the vehicle. However, it is also possible for two dissimilar coils to be used, and the coils to be relatively displaced from a line parallel to the direction of advance of the vehicle by an amount sufficient to compensate for the difference in the characteristics of the two coils. As a further alternative two dissimilar coils may be used, either arranged in a line parallel to the direction of advance of the vehicle or in a line oblique to the direction of advance of the vehicle, with the output of one coil passed through an attenuator so that the resultant output from the coils is a null output when the direction of advance of the vehicle is in the desired path along or parallel to a line of constant magnetic field strength.

The present invention also comprehends a vehicle including a magnetic sensing head arrangement for indicating directional deviations of the sensing head and the vehicle from a desired direction in relation to a plurality of energized wires, the magnetic sensing head arrangement comprising first and second magnetic detectors disposed on the vehicle for detecting the vertical component of an electromagnetic field and horizontally spaced from one another in the direction of advance of the vehicle, the outputs of the first and second magnetic detectors being connected in phase-opposition when the direction of the vertical component of the magnetic field is the same in both the first and second detectors to produce a resultant output dependent upon the algebraic sum of the signals generated in the first and second magnetic detectors, a phase sensitive detector to which the resultant output from the first and second magnetic detectors is fed together with a reference signal representative of the strength of the vertical component of the magnetic field in the vicinity of the magnetic detectors, whereby the phase sensitive detector will give an output indicative of angular deviations of the vehicle from a desired path in relation to the lines of constant magnetic field strength.

More particularly the present invention comprehends a vehicle including a magnetic sensing head arrangement for indicating directional deviations of the sensing head and the vehicle from a desired direction in relation to a plurality of energized wires, the magnetic sensing head arrangement comprising first and second coils which are disposed on the vehicle with their magnetic axes substantially vertical and which are horizontally spaced from one another in the direction of advance of the vehicle, the outputs of the first and second coils being connected in phase-opposition when the direction of the axial component of the magnetic field is the same in both the coils to produce a resultant output dependent upon the algebraic sum of the voltages induced in the first and second coils, a phase sensitive detector to which the resultant output from the first and second coils is fed together with a reference signal representative of the vertical component of the magnetic field strength in the vicinity of the coils, whereby the phase sensitive detector will give an output indicative of angular deviations of the vehicle from a desired path in relation to the lines of constant magnetic field strength.

The reference signal may be obtained from a third coil vertically disposed either near to one of the coils or midway between the two coils. Such an arrangement enables the first two coils to be connected together in the same tuned circuit which reduces the influence on the difference signal of variations in the characteristics of the individual coils.

However, when the two coils are connected in separate tuned circuits the reference signal may be obtained from either one of the two coils or even from both coils.

The present invention will be further understood from the following detailed description, which is made by way of exemplification, with reference to the accompanying drawings, in which.

Figure 3:
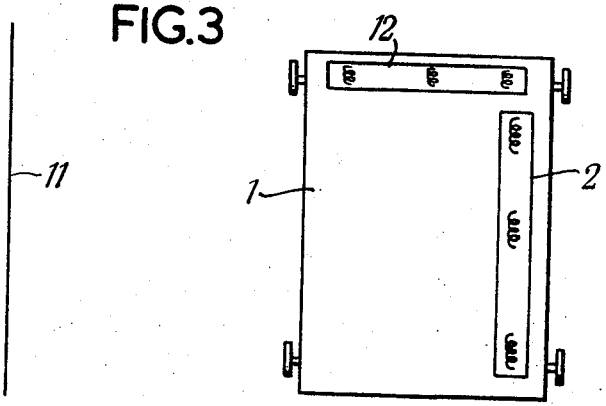
Figure 4:
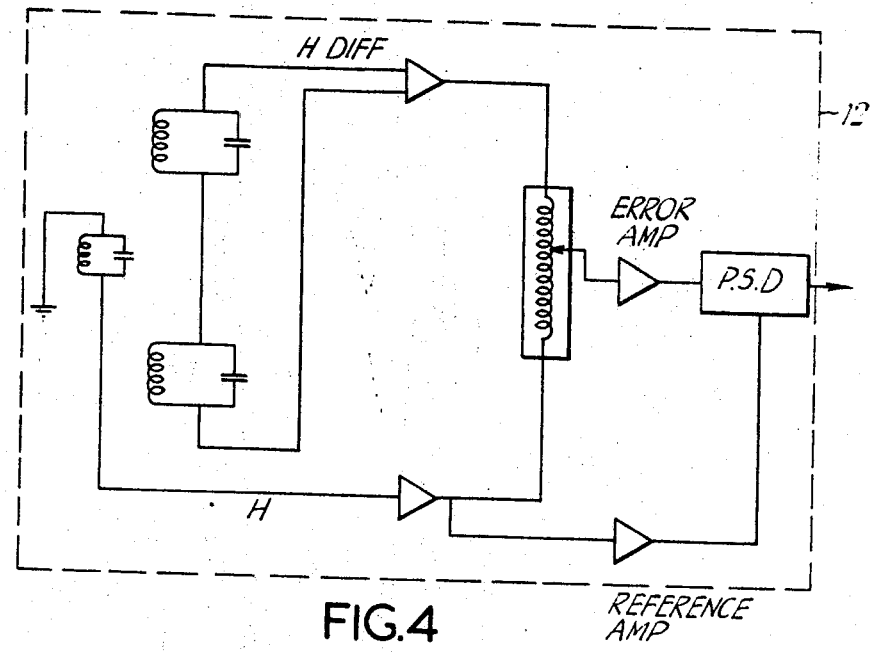
Figure 5:
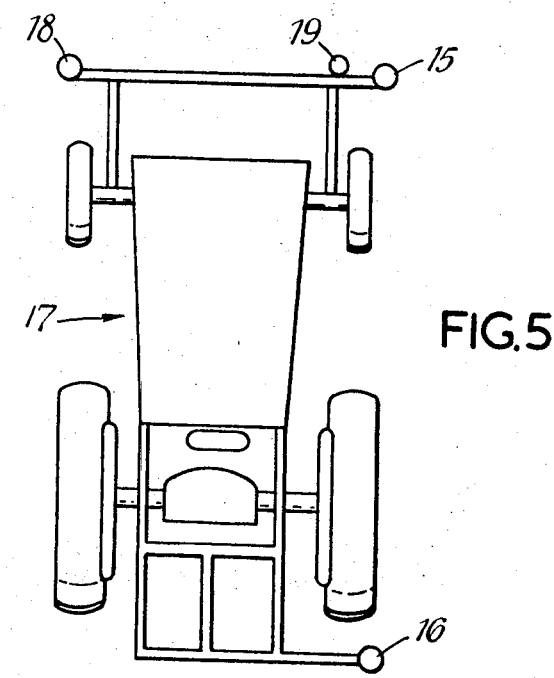
Figure 6:
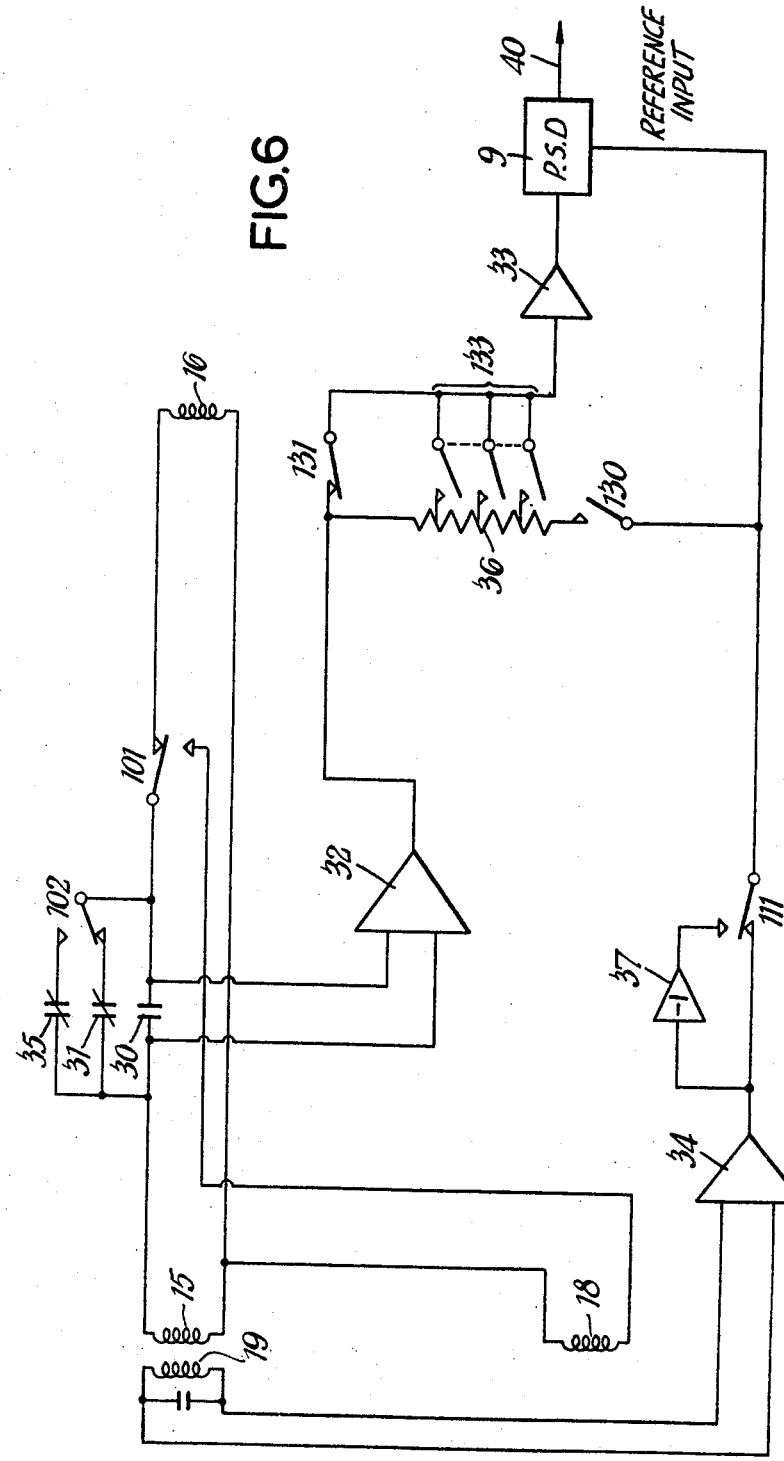
Figure 7:
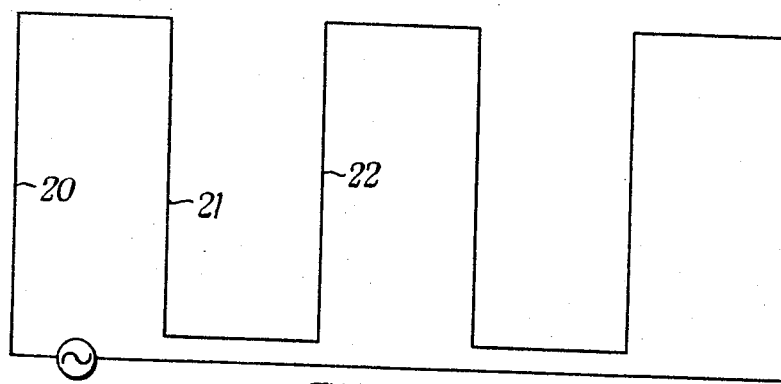
Figure 8:
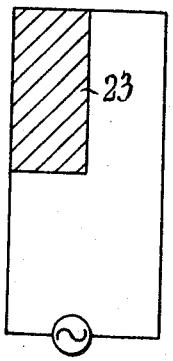
Figure 9:
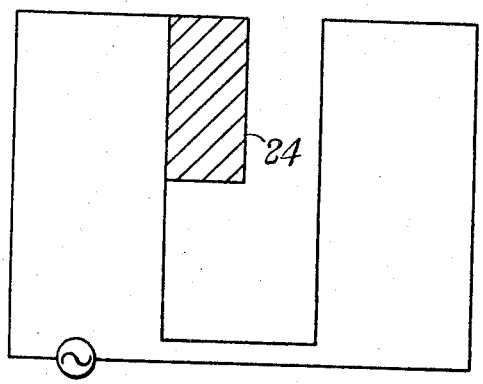
Figure 10:
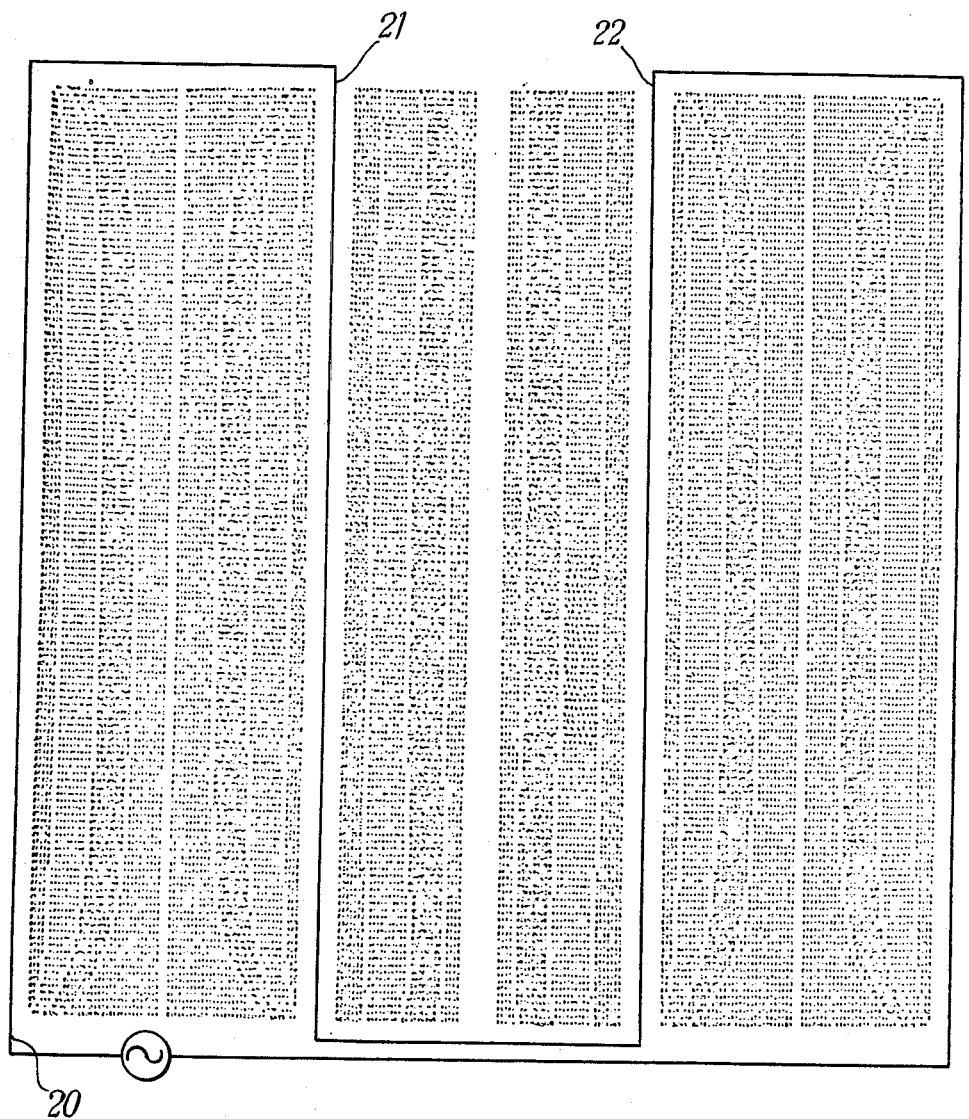
Figure 11:
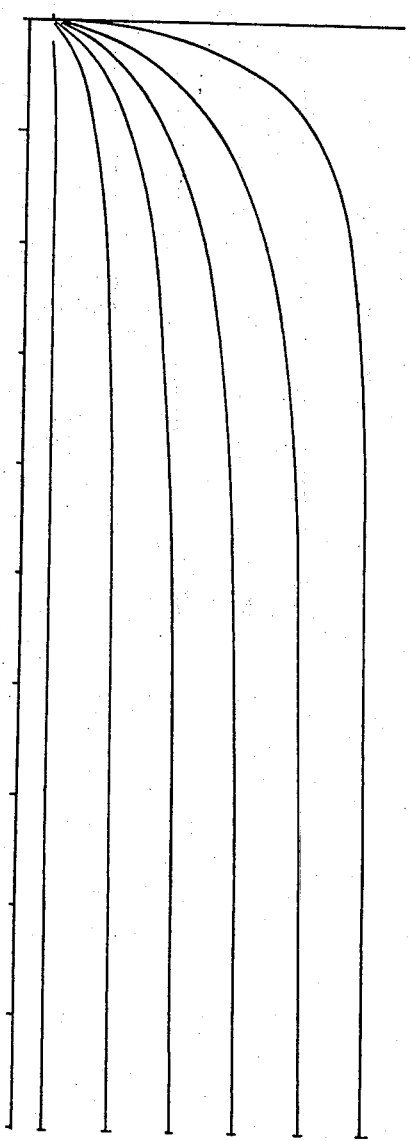
Figure 12:
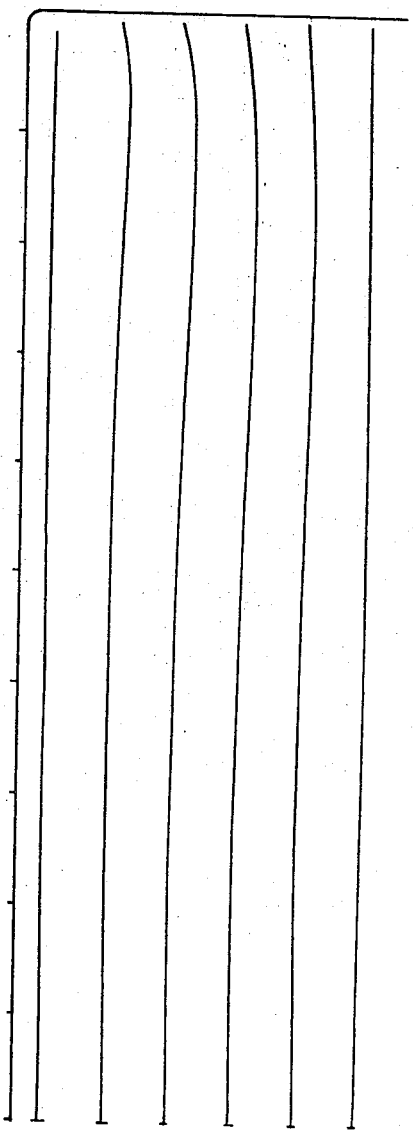
Figure 13:
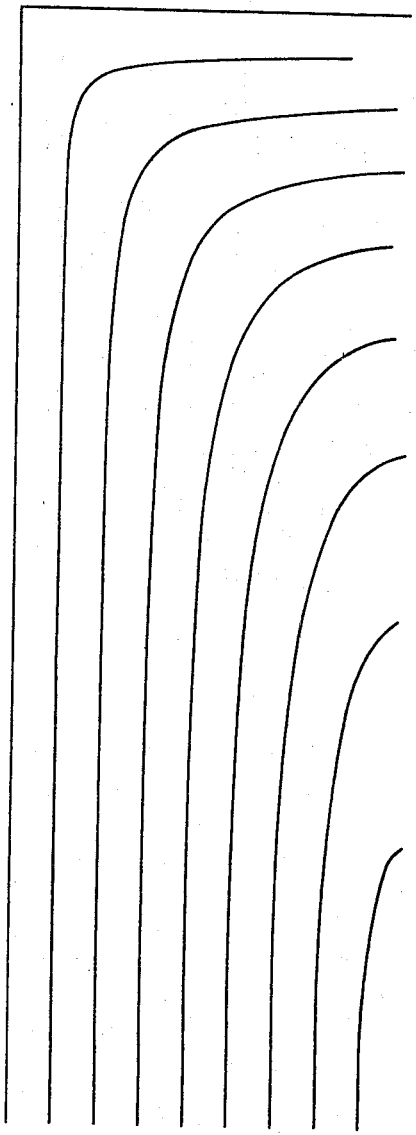
Figure 14:
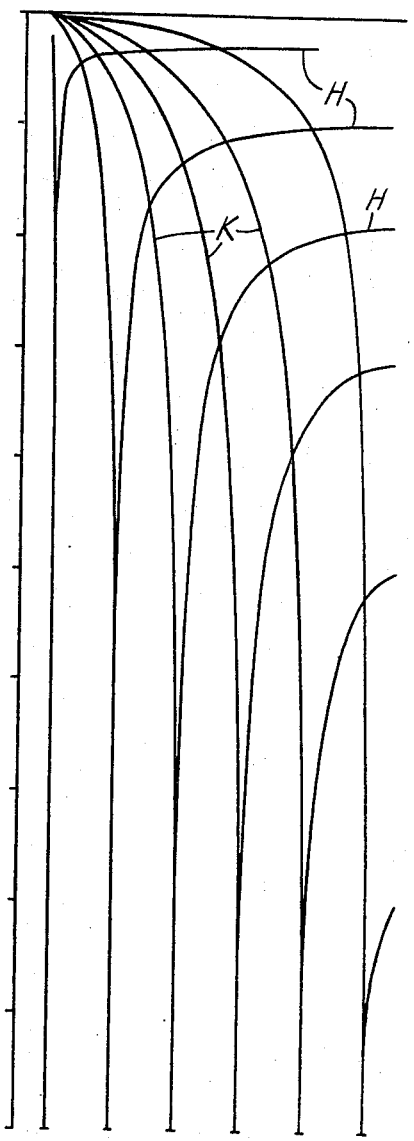
Figure 15:
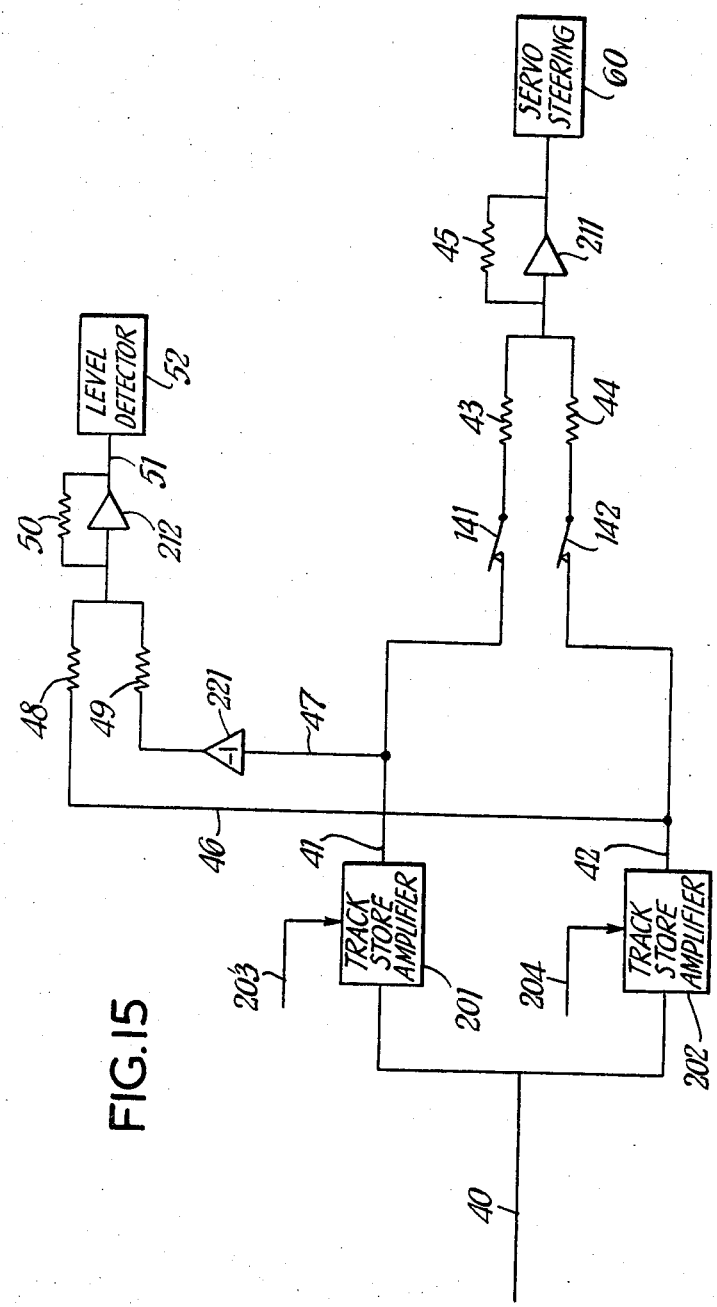

FIG. 3 indicates diagrammatically a tractor in which the present invention is employed in conjunction with the invention which forms the subject matter of our co-pending patent application Ser. No. 865,931;

FIG. 4 is a block diagram of a magnetic sensing head arrangement for controlling the lateral position of a vehicle in relation to guide wires in accordance with co-pending patent application Ser. No. 865,931;

FIG. 5 shows diagrammatically one embodiment of a tractor utilizing the present invention and the invention of our co-pending patent application Ser. No. 865,931;

FIG. 6 shows a suitable circuit arrangement for operating the vehicle under control of lines of constant H or constant K using the coil arrangement shown diagrammatically in FIG. 5;

FIG. 7 shows one example of a possible wiring pattern for a guide wire to control the movement of a vehicle to traverse a particular area;

FIG. 8 shows a shaded area effectively within a loop of the guide wire of FIG. 7;

FIG. 9 shows a similar sized shaded area similarly positioned to a length of guide wire, but between two loops of guide wire;

FIG. 10 shows diagrammatically contours of constant gradient (K) of magnetic field strength for an area covering the first two loops of guide wire in FIG. 7;

FIG. 11 shows the contours of constant K in the shaded area of FIG. 8;

FIG. 12 shows the contours of constant K within the shaded are of FIG. 9;

FIG. 13 shows the contours of constant magnetic field strength (H) within the shaded area of FIG. 8, FIG. 14 shows superimposed upon one another the contours of constant H and constant K within the shaded area of FIG. 8, and FIG. 15 shows a further circuit arrangement for connection to the circuit of FIG. 6 to enable a vehicle to be guided in a relatively straight path as it enters the shaded area of FIG. 8 and also to be guided round a corner in the shaded area of FIG. 8.

In the drawings the same or similar parts are designated by like reference numerals.

Figure 1:
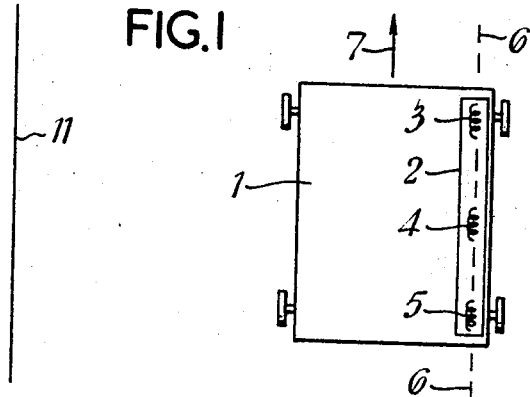
FIG. 1 is a diagrammatic plan view of one example of a tractor having thereon a magnetic sensing head arrangement for guiding the tractor along a path parallel to the lines of constant magnetic field strength which are present in a system of electromagnetic guide wires.

Referring to FIG. 1, there is shown diagrammatically a vehicle 1 having a magnetic sensing head arrangement 2 including coils 3, 4, and 5 each arranged with its magnetic axis vertical and equally spaced from one another along a line 6 parallel to the direction 7 of advance of the vehicle.

Figure 2:
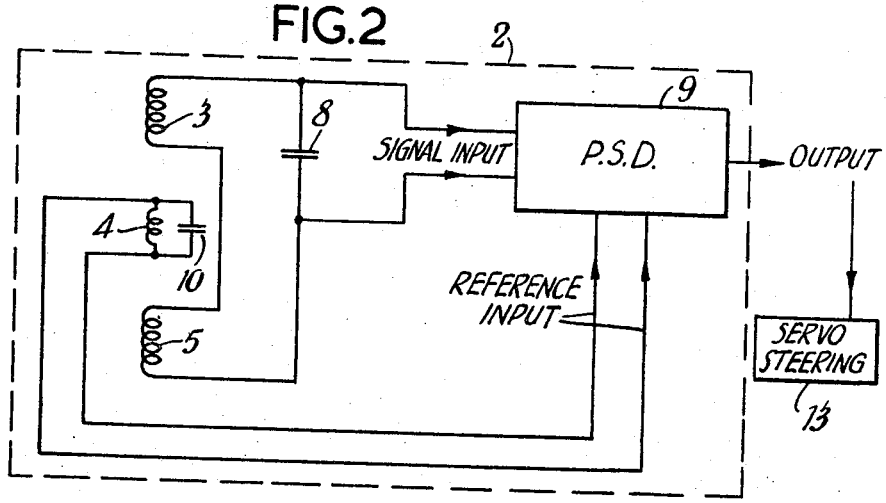
FIG. 2 is a circuit diagram showing the connections for coils of the magnetic sensing head arrangement of FIG. 1.

Referring now to FIG. 2, there is illustrated the manner in which the coils 3, 4, and 5 are connected in the electrical circuit for giving an output which is dependent on the difference in signal response between the coils 3 and 5. The coils 3 and 5 are identical coils which are connected in phase-opposition in a tuned circuit with a capacitor 8, and the output from this circuit, which is a difference signal, is fed as the signal input to a phase sensitive detector 9.

The coil 4, which is vertically disposed midway between the horizontal spacing of the coils 3 and 5 along the line 6, is connected in a separate tuned circuit with a capacitor 10 and the output from this tuned circuit is connected to the phase sensitive detector 9 as a reference input.

When the vehicle 1 is following a path exactly parallel to the lines of constant magnetic field strength, the signal response in each of coils 3 and 5 is the same, there is consequently no difference signal developed across capacitor 8 for application to the phase sensitive detector 9, and there is no output from the phase sensitive detector 9. As soon as the vehicle 1 starts to move in a direction which is at an angle to the lines of constant magnetic field strength, the coils 3 and 5 will have different responses so that a signal is applied to the phase sensitive detector 9 which will give an output the magnitude of which represents the amount of deviation from a line parallel to the lines of constant magnetic field strength, and the sign of which indicates whether the deviation is an angular deviation to the left or the right of the lines of constant magnetic field strength. Consequently the output signal from the phase sensitive detector 9 is an unambiguous representation of the directional deviation of the vehicle 1 from the desired path parallel to the lines of constant magnetic field strength. Preferably the output signal from the phase sensitive detector 9 is applied in known manner to a servo steering mechanism 13 so that the advance of the vehicle 1 is controlled along a path parallel to the lines of constant magnetic field strength.

The method and apparatus of the present invention may be used in conjunction with other methods of guiding a vehicle. In FIG. 3 there is shown a tractor which has a magnetic sensing head comprising two magnetic sensing head arrangements. These are respectively a magnetic sensing head arrangement 2 in accordance with the present invention, and another magnetic sensing head arrangement 12 of the kind described and claimed in the complete specification of our cognate co-pending patent applications Ser. No. 865,931, for sensing lateral deviations of the vehicle 1 from a desired path in relation to the guide wire 11. A schematic circuit diagram of the magnetic sensing head arrangement 12 described in our cognate co-pending patent applications Ser. No. 865,931 is shown in FIG. 4. For a detailed description of the operation of this magnetic sensing head arrangement, reference should be made to the Specification of the said cognate co-pending patent applications. Suffice it to say here that in the method described in those cognate patent applications the path in which the vehicle is guided follows a line of constant K, where $K = H\text{diff}/H$, $H\text{diff}$ being the difference in vertical magnetic field strength at the coils 15 and 18 of FIG. 5, and $H$ being the field strength in the vicinity of those coils, for example, at the coil 19 of FIG. 5.

Advantageously the magnetic sensing head arrangements 2 and 12 may be connected alternatively to a servo steering mechanism, so that the vehicle may be controlled by one or other or both of the magnetic sensing head arrangements in different parts of its traverse of an enclosed area containing a set of guide wires.

In accordance with this aspect of the present invention there is provided a vehicle including a magnetic sensing head for controlling the advance of the vehicle in relation to a system of energized wires, the magnetic sensing head comprising a first pair of magnetic detectors disposed on the vehicle for detecting the vertical component of an electromagnetic field and horizontally spaced from one another in the direction of advance of the vehicle, a second pair of magnetic detectors disposed on the vehicle for detecting the vertical component of an electromagnetic field and horizontally spaced from one another in a direction perpendicular to the direction of advance of the vehicle, the outputs of the magnetic detectors of each pair being connected in phase-opposition when the direction of the axial component of the magnetic field is the same in both detectors of the pair so that each pair of detectors is capable of producing a resultant output dependent upon the algebraic sum of the signals induced in the two detectors comprising that pair, means for feeding the resultant output from the first pair of detectors to a phase sensitive detector together with a reference signal representative of the vertical component of the magnetic field strength in the vicinity of the first pair of detectors, means for comparing the resultant output of the second pair of detectors with a signal representative of the vertical component of the magnetic field strength in the vicinity of the second pair of detectors, further means for feeding any difference signal resulting from said comparison to a phase sensitive detector together with a reference signal representative of the vertical component of the magnetic field strength in the vicinity of the second pair of detectors, and means for selectively controlling a servo steering mechanism on the vehicle in accordance with either the resultant output from the first pair of detectors or the difference signal resulting from said comparison.

Whilst a separate phase sensitive detector may be provided for connection to a respective one of the pairs of magnetic detectors, alternatively a single phase sensitive detector may be provided with an appropriate switching means for feeding to the phase sensitive detector as the signal input either the resultant output from the first pair of detectors, or the difference signal resulting from the comparison of the resultant output of the second pair of detectors with a signal representative of the vertical component of the magnetic field strength in the vicinity of the second pair of detectors.

The reference signal which is fed to the phase sensitive detector may be a signal received in a single detector located in the vicinity of both the first and second pairs of magnetic detectors.

Also instead of providing four magnetic detectors to comprise the two pairs, one magnetic detector may be used in each of the pairs so that, for operation of the first pair of detectors, the common detector is used in conjunction with a detector spaced from it in the direction of advance of the vehicle, and for the second pair of detectors the common detector is used in conjunction with another detector spaced from it laterally on the vehicle, that is to say in a direction perpendicular to the direction of advance of the vehicle.

An arrangement of this kind is indicated diagrammatically in FIG. 5 of the accompanying drawings. In this figure a coil 15, having its magnetic axis vertical, is the common magnetic detector which is connected as a pair with a similar coil 16 at the opposite end of a tractor 17, when the vehicle is to be guided along a path parallel to the lines of constant magnetic field strength, as described with reference to FIGS. 1 and 2. The coil 15 is connected as a pair with a similar coil 18 at the opposite side of the tractor 17 when the tractor is to be guided along a path which is laterally offset a predetermined distance from a guide wire in the manner described in our cognate co-pending patent applications Ser. No. 865931.

A further coil 19 which is positioned near to the coil 15 is used to provide a reference signal representative of the vertical component of the magnetic field strength in the vicinity of both pairs of detectors. The output from the coil 19 is connected to the phase sensitive detector during both modes of controlling the tractor 17, and an output derived from the coil 19 is also used for the comparison with the resultant output of the pair of coils 15 and 18 when the tractor 17 is being guided on a path laterally offset from a guide wire.

FIG. 6 of the accompanying drawings is a circuit diagram for utilizing the arrangement of coils shown diagrammatically in FIG. 5 in order to control the vehicle to follow either a line of constant magnetic field strength, or, alternatively, a selected one of a number of available lines of constant gradient of magnetic field strength.

Referring to FIG. 6, coils 15 and 16 are connected in a tuned circuit with capacitors 30 and 31 by a contact 101. Capacitor 31 is a trimming capacitor which is selected by a contact 102 to be in parallel with the capacitor 30, so that the circuit is tuned accurately to the frequency emitted by the guide wire.

Any difference signal resulting from different responses in coils 15 and 16 due to the tractor being at an angle to a line of constant magnetic field strength will appear as an output signal across capacitor 30. This difference signal is amplified in an amplifier 32, and is applied via a normally closed contact 131 and a further amplifier 33 as a signal input to phase sensitive detector 9.

A signal from the tuned circuit which includes coil 19 is applied to amplifier 34 and is then passed via contact 111 to the phase sensitive detector 9 as a reference input.

In the circuit of FIG. 6 with the contacts in the positions illustrated in that figure, the vehicle is to be guided substantially along a line of constant magnetic field strength (constant H) under the control of the similar coils 15 and 16 which are situated on a line extending fore and aft of the vehicle. When the vehicle is to be controlled so that it is guided substantially along a line which is effectively a line of constant gradient of magnetic field strength (constant K) in accordance with the invention described and claimed in the Specification of our cognate co-pending patent applications Ser. No. 865,931, contacts 101 and 102 are changed over to their alternative positions, contact 131 is opened, contact 130 is closed and a selected one of the contacts 133 is operated to choose the particular line of constant K which it is desired that the vehicle shall follow.

With the contacts operated to the positions now described, the similar coils 15 and 18 which are laterally spaced on the front of the vehicle are connected together in a tuned circuit with capacitor 30 and trimming capacitor 35. The trimming capacitors 31 and 35 are provided in order to counteract variations which would otherwise occur in the tuning when switching from one tuned circuit to the other.

The difference signal arising from different responses in the coils 15 and 18 is now applied via amplifier 32 to one end of the potentiometer which is comprised by resistor 36 and the set of contacts 133.

A signal derived from the tuned circuit which contains the coil 19 is applied via amplifier 34 and contact 111 to the phase sensitive detector 9 as a reference input, and also via contact 130 to the potentiometer comprising the resistor 36 and the set of contacts 133. Consequently a comparison between a selected part of the signals applied to the potentiometer may be made by choosing the appropriate one of the set of contacts 133. A different line of constant K is chosen by operating a different one of the set of contacts 133.

The contact 111 is provided for switching an inversion amplifier 37 selectively into the circuit depending on whether the tractor is following a line of constant K which is left or right of a center line between an outgoing wire of a loop of the guide wire circuit and the return wire of the loop.

The selection of which pair of magnetic detectors or coils shall control the servo steering mechanism on the tractor may be effected under the control of a computer program, which is included on the tractor and which is representative of the path which the tractor is to follow in relation to the particular guide wires and the particular implement which is being used with the tractor. Alternatively, however, the selection of the particular pair of detectors or coils to control the steering of the vehicle may be effected as a result of detection of the magnetic field or another variable.

For example, there is shown in FIG. 7 a wiring pattern for a guide wire laid in a field. The spacing between adjacent longitudinal arms 20, 21 and 22 of the guide wire is of the order of 100 feet. Preferably the vehicle is caused to traverse the area to be worked in a series of paths which are parallel to the longitudinal arms 20, 21, and 22 of the guide wire using a circuit such as shown in FIG. 4 (or the tuned circuit containing the coils 15 and 18 of FIG. 6) for a series of paths of constant K which are laterally offset by different distances from the respective longitudinal arms 20, 21, and 22 of the guide wire in turn.

In practice the lines of constant K have different shapes according to the area within the wiring pattern of FIG. 7 at which they are situated. FIGS. 8 and 9 show shaded areas 23 and 24 which are similarly situated in relation to a longitudinal arm of the guide wire, but the area 23 is effectively within a loop of the guide wire, whereas the area 24 is between adjacent loops of the guide wire. FIG. 10 shows diagrammatically the contours of constant K for a pattern of guide wire having two loops, and FIGS. 11 and 12 reproduce those parts of the contours of constant K which fall within the areas 23 and 24 of FIGS. 8 and 9.

Whilst it is possible to guide a vehicle in area 24 along a line of constant K and to effect traverse of the whole area by using a series of values of K, it is not possible to do this in the area 23 because of the marked curvature of the lines of constant K towards a corner of the loop.

The method of the present invention enables the vehicle to follow a line of constant magnetic field strength, that is to say a line of constant H. In FIG. 13 there are shown the contours of constant H for the area 23, and it will be seen that the contours of constant H approximate to rectangles near the guide wire and approximate to ellipses near the center of the loop of guide wire.

Consequently an effective traverse of the whole of an area 23 within a loop may be effected by causing the vehicle to follow a line of constant K until this line deviates from a straight path and then causing the vehicle to be guided by a method which utilizes the present invention. This can be effected simply by causing the servo steering mechanism on the vehicle to be controlled, for example, by the magnetic sensing head arrangement 2 of FIG. 3, instead of by the magnetic sensing head arrangement 12, so that the vehicle turns a corner under the guidance of a line of constant H.

In FIG. 14 there are shown superimposed upon one another in the area 23 contours of constant H and contours of constant K. The deviation of these contours from the straight as a vehicle approaches a corner of the loop of guide wire are in opposite directions, and therefore an approximation of the traverse of the vehicle to a straight line within the area 23, and before the turn at the corner is reached, may be made by sensing the contours of both constant H and constant K and using the algebraic sum of their error or correction signals to guide the vehicle.

If two separate sensing heads are provided, one for sensing angular deviations from the lines of constant H, and the other for sensing lateral deviations from the lines of constant K, the error or correction signals obtained from these two sensing operations may be applied directly and simultaneously to an amplifier so as to obtain from the amplifier a combined signal dependent on the two applied signals. This combined signal which may be a difference signal, or an average of the two applied signals, can be used for steering the vehicle by application of the combined signal to a servo steering device.

With the arrangement described in FIG. 6 of the accompanying drawings it is not possible for the respective deviations from the lines of constant H and constant K to be sensed simultaneously. In this case a combined signal may be obtained by sensing the respective deviations from the lines of constant H and the lines of constant K alternately in a "chopping" action in which the outputs from the phase sensitive detector 9 are combined in a circuit such as that illustrated in FIG. 15 of the accompanying drawings.

The output from the phase sensitive detector 9 of FIG. 6 is given along line 40, which line is also shown on FIG. 15. The output on line 40 from phase sensitive detector 9 is applied to the track store amplifiers 201 and 202.

The track store amplifiers 201 and 202 are well known devices which are capable of giving an output corresponding to the last input which was applied to them after that input has ceased to be present as well as during the period that the input is applied. The application of the inputs to the track store amplifiers 201 and 202 is controlled by signals applied to the track store amplifiers via lines 203 and 204 respectively.

The program on the vehicle is arranged to control contacts 101, 102, 130, and 131 of FIG. 6 so that the vehicle can be controlled from either a line of constant H or a line of constant K. As the vehicle is approaching a corner part of the area bounded by a guide wire, the program is designed to operate the contacts 101, 102, 130, and 131 continuously at a rate of one cycle per second so that the magnetic sensing head arrangement of FIG. 6 is switched continuously between the two operating modes under which the phase sensitive detector 9 gives outputs indicative of the deviations of the vehicle from a line of constant K and a line of constant H.

The program on the vehicle also supplies signals to the line 203 so that the track store amplifier 201 receives an input when the magnetic sensing head of FIG. 6 is operating to detect a deviation from a line of constant K, and to the line 204 so that the track store amplifier 202 is operative to receive an input when the magnetic sensing head of FIG. 6 is operating to detect a deviation from a line of constant H. During the period when the track store amplifier 201 is not operative to receive an input, that is to say the period when the magnetic sensing head arrangement of FIG. 6 is operating to detect a deviation from a line of constant H, the track store amplifier 201 still gives an output along line 41 indicative of the deviation of the vehicle from the selected line of constant K. Similarly the track store amplifier 202 gives an output along line 42 indicative of the angular deviation of the vehicle from a line of constant H, even when the magnetic sensing head of FIG. 6 is detecting the lateral deviation from a line of constant K. In each case the output given by the track store amplifiers 201 and 202 corresponds to the last input applied to those track store amplifiers.

Through the closed contacts 141 and 142, the outputs from the track store amplifiers 201 and 202 are applied via resistors 43 and 44, respectively, to the combination of amplifier 211 and resistor 45, which is known as an operational amplifier.

The arrangement which consists of resistors 43, 44, 45 and amplifier 211 is a summing amplifier in which the signals present in lines 41 and 42 are added in the same proportion as the values of the resistors 43 and 44. The values of the resistors 43 and 44 are adapted so that the error signals are made proportional to the deviations of the vehicle from the lines of constant K and constant H. The output from amplifier 211 is a combined signal resulting from the addition of the two signals applied from the two resistors 43 and 44, and, because these signals have opposite signs, this combined signal is a mean or average of the error signals detected by phase sensitive detector 9 when the position of the vehicle is being related respectively to a line of constant K and a line of constant H. The combined signal which is the output from amplifier 211 is applied to a servo steering device 60 in order to control the vehicle.

Because the lines of constant H and constant K are divergent in opposite directions as a corner is approached, the combined signal which is obtained from the two error signals will be a line substantially straighter than either the K line or the H line. The vehicle is therefore guided in a path between these lines.

This arrangement causes the vehicle to continue in a relatively straight line until a part of the area is reached in which the deviation from the straight of an H line becomes substantially greater than the deviation of a K line from the straight. This may be observed from FIG. 14. The circuit illustrated in FIG. 15 also detects when the vehicle has reached this part of the traverse of the area, which is the close approach to the corner. At this part of the traverse the level of the K and H error signals are both increasing fairly rapidly. This fact is made use of in order to terminate the guidance of the vehicle under control of the combined signal and to cause the vehicle to be guided to follow a line of constant H.

In the circuit of FIG. 15 the error signals from the track store amplifiers 201 and 202 are applied via lines 46 and 47 to another summing amplifier essentially similar to that comprised by the resistors 43, 44, 45 and the amplifier 211. Line 46 leads through resistor 48 to a combination of resistor 50 and amplifier 212, while line 47 leads through resistor 49 to that same combination. An inversion amplifier 221 is included in line 47 so that the sign of the two error signals applied to the combination of resistor 50 and amplifier 212 is the same. Therefore the addition will generally give an output signal from amplifier 212 which is substantially larger than either of the input signals taken from the track store amplifiers 201 and 202.

In the output line 51 from the amplifier 212 there is included a level detector 52. Level detector 52 is inoperative until the signal in line 51 reaches a level indicative of a close approach to the corner of the area. When this high level of signal resulting from the addition of the two error signals, rather than from a difference between them or an average of them, is detected by level detector 52, the level detector 52 gives an output signal to operate a relay (not shown) which controls contact 141 so that this contact is opened and only one signal is applied to the combination of amplifier 211 and resistor 45, this being the error signal from the track store amplifier 202 which denotes the deviation of the vehicle from a line of constant H. Consequently, once the level detector 52 has operated to open contact 141 the vehicle is guided along a line of constant H and therefore effectively turns the corner.

Whilst the vehicle is turning the corner by following a line of constant H, the switching action of relays 101, 102, 130, and 131 is continued and therefore the error signal or deviation from a line of constant K remains available at the output of the track store 201. The error signal at the output of track store 202, however, is kept substantially at zero by the whole system because the vehicle is being steered to follow a line of constant H.

When the turn of the corner is completed, the vehicle starts to come back on a reverse track along a line of constant H, and this leads in towards a junction of a line of constant H with a different line of constant K. This new line of constant K may be a line of similar value of K but in the opposite half of the area, or it may be a line of constant K having a value of K different from the K value of the last line by an amount corresponding to a width of the implement which is being operated by the vehicle.

At this stage of the operation the lines of constant H and constant K are convergent. Therefore, as the turn is completing and the point is being approached at which straight line operation is to be resumed, the K error signal at the output of track store amplifier 201 reduces. As already stated, the error signal for H is approximately zero because the vehicle is following a line of constant H, and therefore the output of amplifier 212 is approximately equal to the K error. When the K error falls below the predetermined level at which the level detector 52 is set, the relay (not shown) which controls contact 141 is released so that contact 141 becomes closed. In this condition steering of the vehicle is once more controlled by the combined signal derived from the error signals for both the K and H modes of operation, and straight line working is restored.

In addition to the level detector 52, the output from amplifier 212 along line 51 may be applied to another level detector which is arranged to operate a relay (not shown) which controls contact 142. This other level detector will be so arranged that it operates the relay controlling contact 142 to open the contact 142 when the signal present in line 51 falls below a comparatively low level, which is indicative that there is no divergence of any substance between the lines of constant H and the lines of constant K. When contact 142 is opened the vehicle is controlled continually along a line of constant K.

Alternatively the programme on the vehicle may be arranged to cause the switching of the control back from the detection of a combined signal based on both the K and H error signals to a control along a line of constant K, and, if the program on the vehicle is used for this purpose, the cycling or continuous switching of the contacts 101, 102, 130, and 131 can also be stopped.

In accordance with this aspect of the present invention there is provided a vehicle guidance system, wherein a vehicle is caused to traverse an area bounded by a guide member capable of emitting an electromagnetic guide signal, wherein the vehicle is caused to advance in a relatively straight line as the vehicle approaches a corner of the area by deriving a first signal indicative of the relationship of the vehicle to a line of constant gradient of magnetic field and a second signal which is a difference signal obtained from two detectors spaced apart on the vehicle by a distance having a component in the direction of advance of the vehicle, which second signal indicates a departure of the vehicle from a line of constant magnetic field strength, further deriving a combined signal from the first and second signals when these signals indicate departures in opposite directions from a line of constant gradient of magnetic field and a line of constant magnetic field strength respectively, and utilizing the combined signal to control a servo steering mechanism on the vehicle so that the vehicle is guided along a path substantially straighter than either the line of constant gradient of magnetic field or the line of constant magnetic field strength.

Instead of using the divergence between the lines of constant gradient of magnetic field strength and the lines of constant magnetic field strength to produce a combined signal by which the vehicle is controlled, this divergence may be measured to provide an indication of the position at which the control of the vehicle should be changed from a control along lines of constant K to a control along lines of constant H.

In accordance with this further aspect of the present invention there is provided a vehicle guidance system, wherein a vehicle is caused to traverse an area bounded by a guide member capable of emitting an electromagnetic guide signal, wherein detectors on the vehicle detect signals indicative of the relationship of the vehicle to lines of constant gradient of the magnetic field and signals indicative of the relationship of the vehicle to the lines of constant magnetic field strength, wherein the vehicle is guided to follow a line of constant gradient of magnetic field until a predetermined divergence between the line of constant gradient of magnetic field and the line of constant magnetic field strength is detected whereafter the vehicle is guided to follow a line of constant magnetic field strength under the control of two detectors spaced apart on the vehicle by a distance having a component in the direction of advance of the vehicle until the divergence between the line of constant gradient of magnetic field and the line of constant magnetic field strength is less than the predetermined divergence after which the vehicle is again guided to follow a line of constant gradient of magnetic field.

This further method in accordance with the present invention may be practiced by using a variant of the circuit of FIG. 15 in which the resistors 43, 44, 45 and amplifier 211 are omitted and the two contacts 141 and 142 are both controlled by level detector 52 so that the output of track store amplifier 201 is applied to the servo steering device 60 when the signal in line 51 is below the predetermined level of the level detector 52, and the output of track store amplifier 202 is applied to the servo steering device 60 when the signal in line 51 is above the predetermined level of the level detector 52.

What we claim is:

1. A vehicle including a magnetic sensing head for controlling the advance of the vehicle in relation to a system of energized wires, the magnetic sensing head comprising a first pair of magnetic detectors disposed on the vehicle for detecting the vertical component of an electromagnetic field and horizontally spaced from one another in the direction of advance of the vehicle, a second pair of magnetic detectors disposed on the vehicle for detecting the vertical component of an electromagnetic field and horizontally spaced from one another in a direction perpendicular to the direction of advance of the vehicle, the outputs of the magnetic detectors of each pair being connected in phase-opposition when the direction of the axial component of the magnetic field is the same in both detectors of the pair so that each pair of detectors is capable of producing a resultant output dependent upon the algebraic sum of the signals induced in the two detectors comprising that pair, means for feeding the resultant output from the first pair of detectors to a phase sensitive detector together with a reference signal representative of the vertical component of the magnetic field strength in the vicinity of the first pair of detectors, means for comparing the resultant output of the second pair of detectors with a signal representative of the vertical component of the magnetic field strength in the vicinity of the second pair of detectors, further means for feeding any difference signal resulting from said comparison to a phase sensitive detector together with a reference signal representative of the vertical component of the magnetic field strength in the vicinity of the second pair of detectors, and means for selectively controlling a servo steering mechanism on the vehicle in accordance with either the resultant output from the first pair of detectors or the difference signal resulting from said comparison.

2. A vehicle according to claim 1, wherein there are provided a single phase sensitive detector, and switching means for switching to the phase sensitive detector either the resultant output from the first pair of detectors or the difference signal resulting from the comparison of the resultant output of the second pair of detectors with a signal representative of the vertical component of the magnetic field strength in the vicinity of the second pair of detectors.

3. A vehicle according to claim 1, wherein all the magnetic detectors are coils with their magnetic axes vertically disposed, and wherein there are provided a common coil and switching means for causing the common coil to be connected alternatively as one of the first pair of magnetic detectors or as one of the second pair of magnetic detectors.

4. A vehicle according to claim 1, wherein there are provided track store amplifiers for retaining respectively the resultant output from the first pair of detectors and the difference signal resulting from said comparison, and means for deriving a combined signal from the outputs of the track store amplifiers for feeding to the servo steering mechanism so that the vehicle is steered along a line between a line of constant magnetic field strength and a line of constant gradient of magnetic field.

5. A vehicle according to claim 4, wherein there is provided a summing amplifier for deriving from the outputs of the track store amplifiers a signal greater than the individual signals retained by the track store amplifiers, and a level detector responsive to said greater signal reaching a predetermined value for causing the vehicle to be controlled by the servo steering mechanism in accordance with the resultant output from the first pair of detectors only.

6. In a vehicle guidance system employing at least one guide member bounding an area to be traversed by a vehicle and energized to develop an electromagnetic field in said area, a method of guiding the vehicle in a relatively straight line as the vehicle approaches a corner of said area, comprising the steps of deriving a first signal indicative of the relationship of the vehicle to a line of constant gradient of said field, deriving a second signal indicative of the difference in the strength of field at two points spaced apart on the vehicle by a distance having a component in the direction of advance of the vehicle and controlling the steering of the vehicle in response to changes in said first and second signals indicating departures in opposite directions from a line of constant gradient and a line of constant field strength.

7. In a method as defined in claim 6, the steps of programming the derivation of said first and second signals to derive said first and second signals alternately.

8. In a method as defined in claim 6, the steps of detecting a predetermined magnitude of said departure in opposite directions from a line of constant gradient and a line of constant field strength, then controlling the steering of said vehicle in response to said second signal until said departure is less than said predetermined magnitude, and then again controlling the steering of the vehicle in response to changes in said first and second signals indicating departures in opposite directions from a line of constant gradient and a line of constant field strength.

9. In a method as defined in claim 8, wherein said predetermined magnitude of said departure is detected by the steps of adding said first and second signals to obtain a sum signal greater than either of said first and second signals, and detecting when said sum signal reaches a predetermined level.

10. In a vehicle guidance system employing at least one guide member bounding an area to be traversed by a vehicle and energized to develop an electromagnetic field in said area and employing detectors on the vehicle to detect signals indicative of the relationship of the vehicle to a line of constant gradient of said field and signals indicative of the relationship of the vehicle to lines of constant strength of said field, a guidance method comprising the steps of detecting from said signals the existence and non-existence of a predetermined divergence between a line of constant gradient and a line of constant field strength, responding to the detection of the non-existence of said predetermined divergence to guide the vehicle in response to said signals to follow a line of constant gradient, and responding to a detected existence of said predetermined divergence to guide the vehicle in response to said signals to follow a line of constant magnetic field strength.

11. In a vehicle guidance system for applying a steering control signal to maintain a vehicle in a desired path in spaced relation to a predetermined plane containing an elongated guide member energized to develop an electromagnetic field, said field having a strength varying as a function of the distance from said predetermined plane, first and second detectors for developing AC signals of the same phase and frequency and each having an amplitude proportional to the field strength thereat, means for mounting said first and second detectors on the vehicle at positions spaced apart by a distance having a component in the direction of advance of the vehicle to develop first and second signals having amplitudes in each cycle proportional to the respective distances from said first and second detectors to said predetermined plane, means connecting said first and second detectors in phase opposition to develop in each cycle an AC output of one phase when the effective output of said first detector is greater than the effective output of said second detector and of the opposite phase when the effective output of said first detector is less than the effective output of said second detector, reference signal means for supplying a reference signal of the same frequency as AC signals from said detectors and in fixed phase relationship thereto, and a phase detector responsive to said AC output signal and said reference signal to develop in each cycle a steering control signal having a polarity and magnitude corresponding to the direction and magnitude of any deviation of the steering of the vehicle from said desired path, for immediate correction of the steering of the vehicle to maintain the vehicle in said desired path said first and second detectors comprising first and second coils having axes generally parallel to said predetermined plane and generally transverse to a second plane containing said elongated guide member and transverse to said predetermined plane.

12. In a system as defined in claim 11, said vehicle being movable over a generally horizontal supporting surface with said guide member being horizontal and in proximity to said surface, said predetermined and second planes being respectively vertical and horizontal and said first and second coils having generally vertical axes.

13. In a system as defined in claim 11, said desired path being oblique to a line of constant magnetic field strength.

14. In a system as defined in claim 13, said first and second coils being spaced apart along a line oblique to the direction of advance of the vehicle.

15. In a system as defined in claim 13, said coils being spaced apart along a line parallel to the advance of the vehicle, the ratio between the effective AC output of said first coil and the field strength thereat being different from the effective AC output of said second coil and the field strength thereat.

16. In a system as defined in claim 11, means for adjusting the relation of the respective ratios between the AC outputs of said coils and the field strengths thereat.

17. In a system as defined in claim 11, said detectors comprising first and second coils, capacitance means, means connecting said coils in series with each other and with said capacitance means to form a tuned circuit resonant at said frequency, said AC output signal being developed across said capacitance means.

18. In a system as defined in claim 11, said reference signal means comprising a third detector disposed between said first and second detectors.

* * * * *